United States Patent
Afshari et al.

(10) Patent No.: US 11,078,627 B2
(45) Date of Patent: *Aug. 3, 2021

(54) HIGH TENSILE STRENGTH PAPER SUITABLE FOR USE IN ELECTROCHEMICAL CELLS

(71) Applicant: DUPONT SAFETY & CONSTRUCTION, INC., Wilmington, DE (US)

(72) Inventors: Mehdi Afshari, Midlothian, VA (US); Byoung Sam Kang, Midlothian, VA (US)

(73) Assignee: DUPONT SAFETY & CONSTRUCTION, INC., Wilmington, DE (US)

(*) Notice: Subject to any disclaimer, the term of this patent is extended or adjusted under 35 U.S.C. 154(b) by 100 days.

This patent is subject to a terminal disclaimer.

(21) Appl. No.: 16/526,135

(22) Filed: Jul. 30, 2019

(65) Prior Publication Data

US 2020/0056332 A1    Feb. 20, 2020

Related U.S. Application Data

(60) Provisional application No. 62/718,447, filed on Aug. 14, 2018.

(51) Int. Cl.
*D21H 13/26* (2006.01)
*D21H 13/12* (2006.01)
*H01M 8/0239* (2016.01)

(52) U.S. Cl.
CPC .......... *D21H 13/26* (2013.01); *D21H 13/12* (2013.01); *H01M 8/0239* (2013.01)

(58) Field of Classification Search
USPC ................................ 162/157, 135
See application file for complete search history.

(56) References Cited

U.S. PATENT DOCUMENTS

| | | |
|---|---|---|
| 3,018,091 A | 1/1962 | Duggins |
| 3,063,966 A | 11/1962 | Kwolek et al. |
| 3,287,324 A | 11/1966 | Sweeny |
| 3,756,908 A | 9/1973 | Gross |
| 3,869,429 A | 3/1975 | Blades |
| 4,308,374 A | 12/1981 | Vollbracht et al. |
| 4,698,267 A | 10/1987 | Tokarsky |
| 4,698,414 A | 10/1987 | Bair |
| 5,026,456 A | 6/1991 | Hesler et al. |
| 5,073,440 A | 12/1991 | Lee |
| 5,084,136 A | 1/1992 | Haines et al. |
| 5,094,913 A | 3/1992 | Yang |
| 5,171,402 A | 12/1992 | Haines et al. |
| 5,202,184 A | 4/1993 | Brierre et al. |
| 6,200,706 B1 | 3/2001 | Ashida et al. |
| 6,511,774 B1 | 1/2003 | Tsukuda et al. |
| 8,211,272 B2 | 7/2012 | Levit et al. |
| 8,936,878 B2 | 1/2015 | Morin |
| 9,637,861 B1 | 5/2017 | Morin |
| 9,666,848 B2 | 5/2017 | Morin et al. |
| 10,767,316 B2 * | 9/2020 | Afshari ............... D21H 13/26 |
| 2003/0180622 A1 | 9/2003 | Tsukuda et al. |
| 2006/0113700 A1 | 6/2006 | Hartzler et al. |
| 2007/0167101 A1 | 7/2007 | Naruse et al. |
| 2007/0287062 A1 | 12/2007 | Tsukuda et al. |
| 2011/0206972 A1 | 8/2011 | Hashimoto et al. |
| 2014/0134496 A1 | 5/2014 | Morin |
| 2016/0197325 A1 | 7/2016 | Alvarado Chacon et al. |
| 2016/0362525 A1 | 12/2016 | Teasley et al. |
| 2017/0204258 A1 | 7/2017 | Teasley et al. |
| 2020/0362516 A1 * | 11/2020 | Afshari ............... D21H 21/14 |

FOREIGN PATENT DOCUMENTS

| | | |
|---|---|---|
| CN | 101381898 A | 3/2009 |
| EP | 0445655 A1 | 9/1991 |
| JP | 07302584 A | 11/1995 |
| JP | 2003059478 A | 2/2003 |
| JP | 2010156063 A | 7/2010 |
| WO | 2005/103376 A1 | 11/2005 |
| WO | 2015/032678 A1 | 3/2015 |

OTHER PUBLICATIONS

Brunauer et al., "Adsorption of Gases in Multimolecular Layers", Journal of the American Chemical Society, vol. 60, vol. 2, 309-319 (1938).

International Search Report, dated Dec. 2, 2019, for international application No. PCT/US2019/045642, filed Aug. 8, 2019; ISA/EPO; Olaf Stachowiak, Authorized Officer.

* cited by examiner

Primary Examiner — Mark Halpern

(57) ABSTRACT

A paper suitable for use as a separator paper in electrochemical cells and an electrochemical cell comprising same, the paper comprising as the sole fibrous components 95 to 100 weight percent fibrils and 0 to 5 weight percent aramid fibrids and having a thickness of 10 to 40 micrometers and a tensile strength of at least 15 megapascals or greater, the fibrils comprising a polymer blend of 80 to 96 weight percent polyparaphenylene terephthalamide and 4 to 20 weight percent of polyvinylpyrrolidone; the fibrils having a diameter of 10 to 2000 nanometers, a length of 0.2 to 3 millimeters, a surface area of 3 to 40 square meters/gram, and a Canadian Standard Freeness of 0 to 10 milliliters.

6 Claims, 3 Drawing Sheets

HIGH TENSILE STRENGTH PAPER SUITABLE FOR USE IN ELECTROCHEMICAL CELLS

BACKGROUND OF THE INVENTION

This invention relates to papers suitable for use as separators in electrochemical cells; that is, useful in separating the cathode from the anode in an electrochemical cell; the paper also having suitable permeability to electrolytes used in such cells. With the ongoing development of higher performing electrochemical cells (or batteries as they are commonly known) the need has increased for papers suitable as separators (commonly known as battery separators) that can also operate at very high temperatures.

United States Publication US2016/0197325 to Alvarado Chacon et al. discloses a paper suitable for use as a separator in an electrochemical cell, including at least 60 wt. % of an aramid fibril and at least 1 wt. % of an aramid fiber. The publication further discloses the paper comprises more specifically at least 5 wt. % aramid fiber and in particular at least 10 wt. % aramid fiber.
As specifically stated therein, these fibrils are generally not obtained by fibrillating fibers; the fibrils have a specific surface area of at most 3 $m^2/g$.

United States Patent Publication US2006/0113700 to Hartzler, et al. discloses composite fibers from aramid polymers, the fibers made by combining an anisotropic solution of an aramid polymer and an isotropic solution of a flexible chain polymer. A composite fiber comprises 80 to 99 weight percent aramid and 1 to 20 weight percent polymer from the isotropic solution of a flexible chain polymer is claimed. The isotropic solution can comprise poly (vinyl pyrrolidone).

One of the requirements for a paper to be suitable for use as a separator in an electrochemical cell is that it be very thin. Many papers that are made very thin and thought suitable for use as separators in electrochemical cells do not perform well in this application. In particular, very thin papers may not have adequate strength for this application, and one response has been to incorporate into the papers a combination of larger and smaller diameter fibrous material, with the larger diameter fibrous material providing more strength to the paper and the small diameter fibrous material filling in the voids between the larger diameter fibrous material. However, such papers have been found to have porosity and/or uniformity problems, including in some instances small pin holes that make such papers unsuitable for use as a separator. While not bound by theory, it is believed such porosity, uniformity, and pin hole problems are be due to the difficulties in uniformly blending and dispersing a very thin layer of the larger diameter fibrous material along with the smaller diameter fibrous material when producing the sheet, resulting in stress concentrations or faults between the larger and smaller diameter fibrous material that ultimately result in undesirably large pores or even holes in the sheet. What is needed is a paper suitable for use as a separator paper in electrochemical cells, that has adequate tensile strength; and in addition, addresses these porosity and uniformity issues.

BRIEF SUMMARY OF THE INVENTION

This invention relates to a paper suitable for use as a separator paper in electrochemical cells and an electrochemical cell comprising same, the paper comprising as the sole fibrous components 95 to 100 weight percent fibrils and 0 to 5 weight percent aramid fibrids and having a thickness of 10 to 40 micrometers and a tensile strength of at least 15 megapascals or greater, the fibrils comprising a polymer blend of 80 to 96 weight percent polyparaphenylene terephthalamide and 4 to 20 weight percent of polyvinylpyrrolidone; the fibrils having diameter of 10 to 2000 nanometers, a length of 0.2 to 3 millimeters, a specific surface area of 3 to 40 square meters/gram, and a Canadian Standard Freeness of 0 to 10 milliliters.

DETAILED DESCRIPTION OF THE INVENTION

Figure 1:
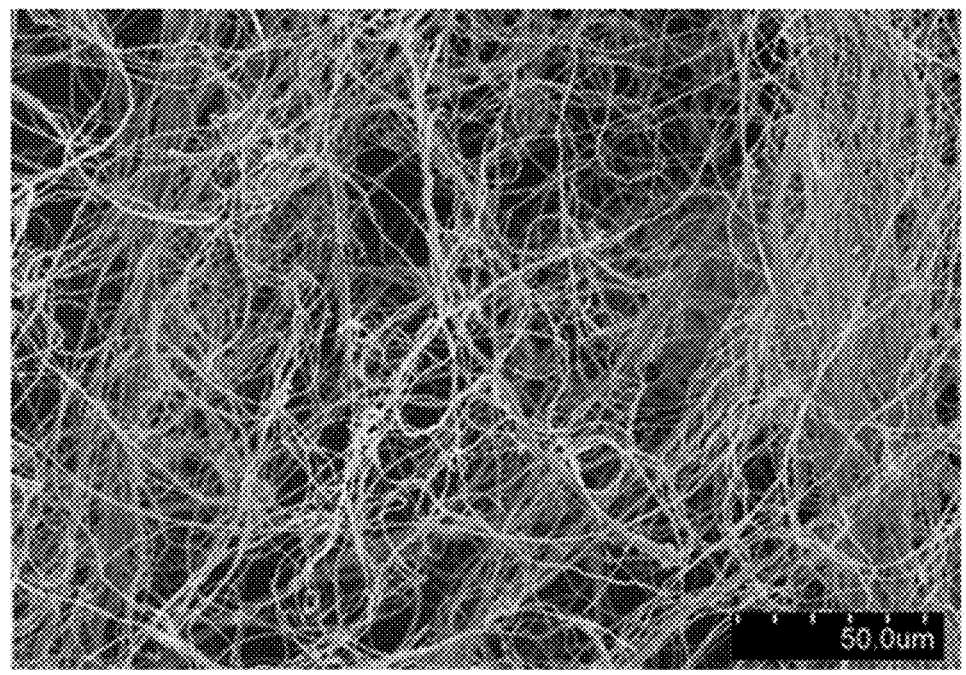
FIG. 1 is a digital photo of PPD-T/PVP fibrils

This invention relates to a paper suitable for use as a separator paper in electrochemical cells and an electrochemical cell comprising that paper. The paper comprises as the sole fibrous components 95 to 100 weight percent fibrils and 0 to 5 weight percent aramid fibrids, the fibrils comprising a polymer blend of 80 to 96 weight percent polyparaphenylene terephthalamide and 4 to 20 weight percent of polyvinylpyrrolidone. The paper has a thickness of 10 to 40 micrometers and a tensile strength of at least 15 megapascals or greater.

Separator papers in electrochemical cells are also known commonly as battery separators and the terms "separator papers" and "battery separators" are used interchangeably herein. Also, the term "electrochemical cell" is used interchangeably herein with the term "battery"; and further, the term electrochemical cell is intended to include such things as capacitors and other devices having (1) a cathode, (2) an anode, (3) a physical separating device between the cathode and anode to help prevent short-circuiting, and (4) some type of electrolyte.

In many uses, battery separators are located between the positive (cathode) and negative (anode) plates in batteries and provide a structural separation between these electrodes of opposite charge, while allowing the electrolyte to assist the passage of current through the separator.

A paper suitable for use as a separator has a number of preferred properties. Included in these preferred paper properties are a specific thickness range; adequate minimum tensile strength that makes it suitable for use in the fabrication of batteries; a suitable mean flow pore size range; and other properties that provide value-in-use, such as flame-retardancy. A flame-resistant paper is especially desirable.

The paper preferably has a thickness of 10 to 50 micrometers. This thickness range is compatible with the typical space available in battery of a paper separator. Paper thicknesses of lower than 10 micrometers are not thought to have adequate strength to handle battery manufacturing steps and paper thicknesses of greater than 50 micrometers have limited applicability due to limited space in a typical battery; also, such thicker papers have increased cost, which is not desirable. In some embodiments, the thickness of the paper is 15 micrometers or greater; in some embodiments, the thickness of the paper is 40 micrometers or less. One preferred paper thickness range is from 15 to 40 micrometers.

The paper has a tensile strength of at least 15 megapascals or greater. It is believed the paper needs this level of tensile strength to survive the battery fabrication process, which includes the cell winding process (wrapping separator with current collector, anode and cathode). The tensile strength also contributes to the dendrite barrier of the separator in use. In some embodiments, the paper preferably has a tensile strength of 50 megapascals or less. In some embodiments, the paper preferably has a tensile strength of 100 megapascals or less. Tensile strengths above this value do not have negative effects, but the parameter reaches a point of diminishing value. In some embodiments, the paper has a tensile strength of from 15 to 50 megapascals. In some embodiments, the paper has a tensile strength of from 15 to 100 megapascals.

In some embodiments, the paper preferably has a mean flow pore size of 0.01 to 1.0 micrometers. It is believed that a paper having a mean flow pore size in this range will have a good electrolyte absorption through capillary force, thereby having low ionic resistance while also having good barrier properties capable of preventing internal shortage caused by lithium metal dendrites. In some preferred embodiments, the paper has a mean flow pore size of about 0.05 to 0.5 micrometers.

The paper comprises 95 to 100 weight percent fibrils and 0 to 5 weight percent aramid fibrids, based on the total amount of fibrils and fibrids in the paper. In some embodiments, the paper comprises fibrils and fibrids, with the fibrils being present in an amount of 95 to less than 100 weight percent, based on the total amount of fibrils and fibrids in the paper. In some embodiments, the fibrous material in the paper is solely fibrils.

The addition of the fibrids in the paper improves the mechanical strength of separator by binding fibrils together; however, the fibrids are also a good barrier in electrolyte transportation and therefore their presence increases ionic resistance.

The paper especially useful as a separator in lithium ion batteries has an ionic resistance of less than about 10 ohms-cm$^2$, and advantageously between about 1 ohms-cm$^2$ and 5 ohms-cm$^2$. In some embodiments, the paper separator has a MacMullin number of between about 2 and 15, and in some embodiments, is about 4 to about 13. In some other embodiments, the MacMullin number is about 4 to about 10. The MacMullin Number (Nm) is a dimensionless number and is a measure of the ionic resistance of the separator, and is defined as the ratio of the resistivity of a separator sample filled with electrolyte to the resistivity of an equivalent volume of the electrolyte alone.

Fibrils are polymeric hair-like fibrous material having a diameter of 10 to 2000 nanometers, preferably 10 to 1200 nanometers. FIG. 1 is representative digital photo of fibrils. Fibrils further have a length of 0.2 to 3 millimeters. As used herein, the "length" of the fibrous material referred to herein, such as the fibrils and pulps, is meant to be the measured "length-weighted average" length. In some preferred embodiments, the fibrils are refined fibrils made from floc by exposing the floc to a refining step that shears the floc into the smaller fibrils.

In some preferred embodiments, the fibrils have a diameter of 200 to 2000 nanometers, and in some preferred embodiments the fibrils have a length that is 1.2 to 3 millimeters. It is believed the diameter of the fibrils has an impact on the pore size of the paper, and that fibrils having a diameter of greater than 2000 nanometers creating a paper having undesirably high pore size. Also, it is believed that fibrils having a length of less than about 0.2 millimeters do not contribute to the paper tensile strength, therefore it is desirable that a majority of the fibrils have a length of 0.2 millimeters or greater.

The fibrils further have an aspect ratio that can range from about 150 to 200,000. The aspect ratio is also known as the length divided by the diameter, and the phrases "aspect ratio", "average length-to-diameter ratio", and "length-to-diameter" are used interchangeably herein. In the case of pulp, the length measurement is understood to be the length of the stalk feature of the pulp, which is also referred to as the "pulpstalk".

In some embodiments, the average length-to-diameter ratio of the fibrils is about 1000 or greater. In some embodiments, the fibrils have an average length-to-diameter ratio of about 3000 or less. In some preferred embodiments, the average length-to-diameter ratio ranges from about 1000 to 3000. The average length-to-diameter ratio of the fibrils is far greater than the average length-to-diameter ratio for conventional 100% PPD-T pulp, such as made by the processes in U.S. Pat. Nos. 5,084,136; 5,171,402; and 8,211,272, which is believed to have an average length-to-diameter ratio generally less than 150; or the average length-to-diameter ratio of highly refined pulp such as disclosed in US patent publications 2016/0362525 and 2017/0204258 which is believed to have an average length-to-diameter ratio less than that of conventional pulp (e.g., generally less than 100).

It is believed fibers having a higher average length-to-diameter ratio contribute to better paper barrier properties, including low/small pore size and higher Gurley-Hill porosity, along with higher paper tensile strength.

The fibrils used in the paper preferably have a Canadian Standard Freeness (CSF) of 0 to 50 milliliters, and in some embodiments, have a Canadian Standard Freeness of 0 to 20 milliliters. CSF is one indication of the fineness of the fibrils, or the degree they are fibrillated during refining, with very fine fibrils having a very low CSF. Low CSF values also are indicative of uniformly sized fibrils, as materials having a wide distribution of sizes generally has high CSF values.

The fibrils defined herein are fibrous material and are distinct from the poly (paraphenylene terephthalamide) (PPD-T) pulps of the prior art. While such PPD-T pulp is made by refining floc or can be made directly from ingredients as was taught in U.S. Pat. No. 5,202,184, such prior art aramid pulps have both "stalks" and fibrils extending from the stalks, with the stalk being a generally columnar remnant of the original floc, being about 10 to 50 microns in diameter.

Figure 2:
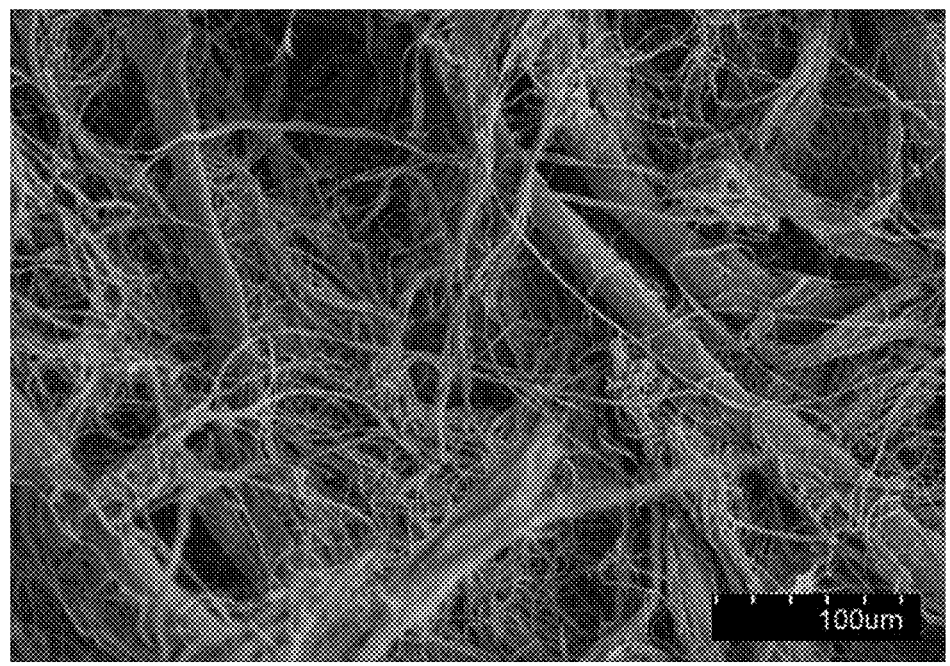
FIG. 2 is a representation of a commercially available PPD-T pulp.

It has been found that when floc made from the specific PPD-T/PVP polymer blend is refined, the result is a fibrous material that is essentially all fibrils; that is, there are essentially no larger stalks present in the material, as shown in the digital photo of FIG. 1. This is compared to traditional PPD-T pulp as shown in FIG. 2.

The specific polymer blend that provides the fibrils of FIG. 1 is a polymer blend of 80 to 96 weight percent polyparaphenylene terephthalamide (PPD-T) and 4 to 20 weight percent of polyvinylpyrrolidone (PVP). It is believed that at least 4 weight PVP must be present in order for the floc to be refined into fibrils with essentially no stalks remaining.

Herein, the term "fiber" is used interchangeably with the term "filament". Fiber spun directly from a polymer solution onto a bobbin without cutting is commonly referred to as continuous fiber or continuous filament, and multifilament yarns comprise a plurality of continuous filaments.

Figure 3:
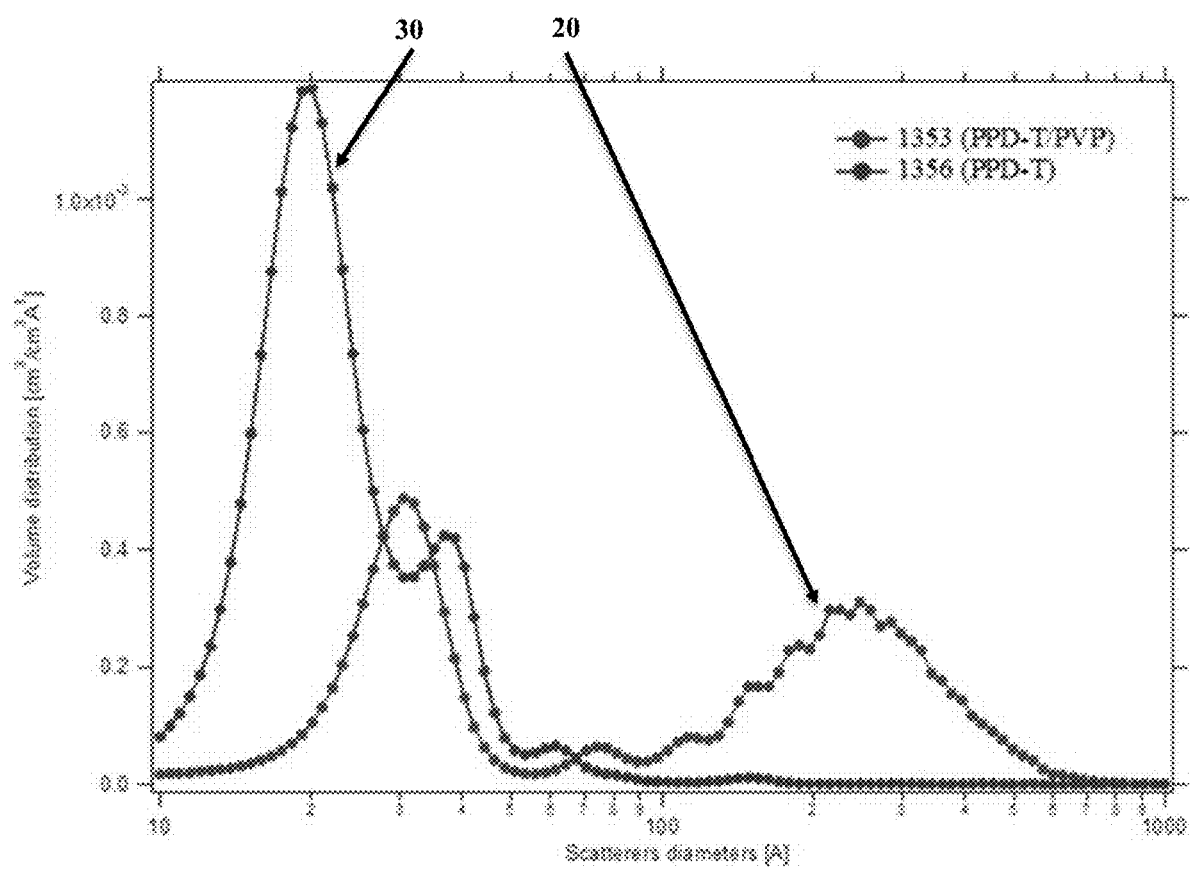
FIG. 3 is a graphical representation comparing the distribution of pores in PPD-T/PVP filaments versus PPD-T filaments.

It has been found that the porosity and the crystal nature of filaments made from the blend of 80 to 96 weight percent PPD-T and 4 to 20 weight percent of PVP are dramatically different from filaments consisting solely of PPD-T. FIG. 3 illustrates the difference in the x-ray scattering of the two types of filaments. Curve 20 is representative of the PPD-T/PVP blend filaments, while curve 30 is representative of the filaments made solely with PPD-T. Curve 30 illustrates the PPD-T filaments have a significant peak centered at about 2 angstroms (and a much lesser peak centered around 4 angstroms) indicating very small pores in the fiber. Curve 20 illustrates the PPD-T/PVP blend has a much broader distribution of pore size, with a peak centered at about 3 angstroms and a very broad sloping peak centered at about 250 angstroms but extending over an area ranging from about 70 to 600 angstroms. It is believed this indicates the filaments made from the PPD-T/PVP blend have a very large number of much larger pores than the PPD-T filaments.

Further, it is believed that because of this difference in the fiber crystallinity and pore structure, when the filaments are mechanically refined, the result is a much finer and more uniform distribution of fibrils, as illustrated in FIG. 1. In other words, it is believed the very high crystallinity and low porosity of the PPD-T fiber means that when it is mechanically refined, the refining shearing action primarily abrades the surface of the filaments creating the typical stalks-with-fibrils structure (as shown in FIG. 2); while the lower crystallinity and high porosity of the PPD-T/PVP blend filaments makes them more conducive to easy separation into individual refined fibrils under the same shearing action; with a larger number of smaller and relatively more uniform diameter fibrils, and more importantly without any stalks (i.e., stalk-free). It is believed the fibrils have a relatively uniform diameter having a total diameter size range of about 300 nanometers as measured visually from SEM photomicrographs.

The fibrils have high surface area and that high surface area is achieved by mechanically refining floc made from the above combination of polymers. The fibrils are made from floc having at least two component polymeric materials and the component polymeric materials must be mutually immiscible so that the polymeric materials will be present in the floc in closely-mixed but separate solid phases. Such flocs, when refined, yield fibrils with domains of two distinct polymeric materials; one phase being the continuous or primary polymer phase, or the PPD-T polymer, and the other phase being the discontinuous or secondary polymer phase, or the PVP polymer.

It is believed the discontinuous or secondary polymer (PVP) is present as small, nanometer-sized crystal domains of material running through the floc and serving, in the refining process, as points of disruption in the floc structure to promote ready and more complete refining into fibrils. After the refining, a portion of the discontinuous or secondary polymer from each disruption point is present on or at the surface of each fibril that results from the refining process.

The words "surface area", "specific surface area", and "BET surface area" are used interchangeably herein. The fibrils have a specific surface area of from about 3 to 40 $m^2/g$. In some embodiments, the specific surface area is 6 $m^2/g$ or greater; in some embodiments, the specific surface area is 8 $m^2/g$ or greater. One particularly preferred range of specific surface area is from 6 to 20 $m^2/g$.

Comparatively, traditional pulp refined from floc made from a single polymeric material, or from a miscible blend of polymeric materials that does not have the domains of discontinuous secondary polymer, will not have such a high surface area. Further, if this floc is refined enough to have such a measured high surface area, the resulting pulp particles have such a low aspect ratio (resulting from very low average length) they will not provide adequate paper strength.

The fibrils comprise 80 to 96 weight percent poly (paraphenylene terephthalamide) (also known and used herein as polyparaphenylene terephthalamide or PPD-T). By PPD-T is meant the homopolymer resulting from mole-for-mole polymerization of p-phenylene diamine and terephthaloyl dichloride and, also, copolymers resulting from incorporation of small amounts of other diamines with the p-phenylene diamine and of small amounts of other diacid chlorides with the terephthaloyl dichloride. As a general rule, other diamines and other diacid chlorides can be used in amounts up to as much as about 10 mole percent of the p-phenylene diamine or the terephthaloyl dichloride, or perhaps slightly higher, provided only that the other diamines and diacid chlorides have no reactive groups which interfere with the polymerization reaction. PPD-T also means copolymers resulting from incorporation of other aromatic diamines and other aromatic diacid chlorides such as, for example, 2,6-naphthaloyl chloride or chloro- or dichloro-terephthaloyl chloride; provided, only that the other aromatic diamines and aromatic diacid chlorides be present in amounts which permit preparation of anisotropic spin dopes. Preparation of PPD-T is described in U.S. Pat. Nos. 3,869,429; 4,308,374; and 4,698,414.

The fibrils comprise 4 to 20 weight percent of poly (vinyl pyrrolidone) (also known and used herein as polyvinylpyrrolidone or PVP. By PVP is meant the polymer which results from linear polymerization of monomer units of N-vinyl-2-pyrrolidone and includes small amounts of co-monomers that may be present in concentrations below those that do not interfere with the interaction of the PVP with the PPD-T. PVP of molecular weights ranging from as little as about 5000 to as much as about 1,000,000 can be used. PVP of very high molecular weight yields spinning dopes of high viscosity. PVP with a molecular weight of about 10,000 to about 360,000 is preferred.

Aramid fibrids, when optionally present in the paper, are used as a binder material. While fibrids are fibrous material, fibrids are not fibers. The term "aramid fibrids" refers to non-granular film-like particles of aromatic polyamide having a melting point or decomposition point above 320° C. The fibrids have an average length of 0.2 to 1 mm with a length-to-width aspect ratio of 5:1 to 10:1. The thickness dimension is on the order of a fraction of a micron. Such aramid fibrids, before being dried, can be used wet and can be deposited as a binder physically entwined about the floc component of a paper. The fibrids can be prepared using a fibridating apparatus such as disclosed in U.S. Pat. No. 3,018,091 where a polymer solution is precipitated and sheared in a single step. The preferred aramid fibrids comprise polymetaphenylene isophthalamide polymer.

By poly (metaphenylene isophthalamide) (also known and used herein as polymetaphenylene isophthalamide or MPD-I) is meant the homopolymer resulting from mole-for-mole polymerization of m-phenylene diamine and isophthaloyl dichloride and, also, copolymers resulting from incorporation of small amounts of other diamines with the m-phenylene diamine and of small amounts of other diacid chlorides with the isophthaloyl dichloride. As a general rule, other diamines and other diacid chlorides can be used in amounts up to as much as about 10 mole percent of the m-phenylene diamine or the isophthaloyl dichloride, or perhaps slightly higher, provided only that the other diamines and diacid chlorides have no reactive groups which interfere with the polymerization reaction. MPD-I also means copolymers resulting from incorporation of other aromatic diamines and other aromatic diacid chlorides, provided only that the other aromatic diamines and aromatic diacid chlorides be present in amounts which do not permit preparation of anisotropic spin dopes. Preparation of MPD-I is described in U.S. Pat. Nos. 3,063,966 and 3,287,324.

Fibrils are preferably made by spinning a continuous filament yarn from a dope containing a combination of PPD-T and PVP, cutting the continuous filament yarn into floc, and then mechanically refining that floc into fibrils in a disk refiner. Example representative processes for making continuous filament yarn are found in U.S. Pat. Nos. 5,073,440 and 5,094,913 and US Pat. Pub. US2006/0113700. Floc fibers are then cut from the continuous filament yarn. The floc generally has a length of from about 2 millimeters to about 25.4 millimeters, in some instances 2 to 10 millimeters, or even 3 to 10 millimeters.

Fibrils are preferably produced by refining the PPD-T/PVP floc using techniques that cut, masticate, or abrade the PPD-T/PVP floc using mechanical methods familiar to papers, e.g., dry and wet disc or cone refining, hydrapulping, and beating. Preferably the refining is conducted on a dispersion of the floc in water, and preferably the dispersion is refined multiple passes through the refiner. That is, the refined dispersion leaving the refiner is recycled back through the refiner for a second pass through the refiner, and so on. The starting dispersion generally has a solids content of about 1 to 4 weight percent of the floc in water. The starting floc preferably has a length of about 3 to 25.4 millimeters (0.125 to 1 inches). Because of the polymer structure of the PPD-T/PVP floc, the floc is fully fibrillated to fibrils after just 3 passes through the refiner and is suitable for making battery separator papers. The fibrils have a very low Canadian Standard Freeness (CSF), which is unique and surprising compared to pulp made from PPD-T fibers or any other fibers that have tendency to fibrillate such as cellulose or acrylic. While suitable fibrils result from three passes through the refiner, additional passes through the refiner may be made, with as many as 20 or more passes thought useful to further distribute and uniformize the fibrils, as long as the final strength of the paper is not negatively affected. Preferably the fibrils are made by recycling the dispersion through the refiner for 3 to 20 passes; in some embodiments 3 to 10 passes through the refiner are used.

Once refined, the fibril-water mixture can be used directly as the furnish for a papermaking machine; or water can be added or removed from the mixture prior to its use as the furnish for the papermaking machine. The fibril-water mixture can optionally be combined with a slurry of a refined fibrid-water mixture to prepare a furnish containing both fibrils and fibrids as the fibrous material for use in a papermaking machine. Because of the high surface area of the fibrils, the consistency of the paper-making furnish is like that of a thick, highly viscous flour-water mixture, similar to a gel. Generally, for making suitable papers, the aqueous furnish should have less than 5 weight percent fibrous material, preferably less than about 0.05 weight percent. It is thought that higher amounts of fibrous material are too viscous to be made into suitable papers. In some embodiments, the aqueous furnish should have less than 5 weight percent fibrils, preferably less than about 0.05 weight percent fibrils.

The fibrous material in water is converted to paper on a suitable paper-making device capable of making very thin papers. Representative devices include continuous process such as, for example without limitation to, a Fourdrinier or inclined wire machine, or batch processes such as those that make paper by hand in a hand-sheet mold containing a forming screen. Reference may be made to U.S. Pat. No. 3,756,908 to Gross and U.S. Pat. No. 5,026,456 to Hesler et al. for general processes of forming aramid materials into papers.

Specifically, commercially-suitable processes for making papers on a paper-making machine can include providing an aqueous dispersion containing the fibrous material, in the desired amount and proportion of fibrils and/or fibrids, to the headbox of the paper-making machine and then uniformly wet-laying and dispersing these solids as a web onto a papermaking wire and removing the majority of the liquid water. The wet web can then be dried on dryer drums to form a paper. Preferably the paper is then further calendered or pressed in the nip of a hot roll calender under pressure and heat, or by other means, to consolidate and densify the paper into a layer having the desired thickness and properties.

The inventors have also found that single layers of the paper containing PPD-T/PVP fibrils have surprisingly good flammability performance when tested in the Thermal Performance Protection Test (TPP). TPP is a measure of the flammability performance to combined radiant and convective heat. The paper containing PPD-T/PVP fibrils was found to have superior TPP performance, when normalized for thickness, to paper made solely from PPD-T floc. That is, the paper containing PPD-T/PVP fibrils performed better on a thickness normalized basis than paper containing PPD-T floc, which is inherently flame resistant, even though the paper did not contain all aramid materials, and actually contained PVP, which is a flammable thermoplastic.

Test Methods

The following test methods were used in the Examples provided below.

Thickness was measured according to ASTM D374-99 and reported in mils and converted to micrometers.

Basis Weight was measured according to ASTM D 646-96 and reported in $g/m^2$.

Gurley Hill Porosity was measured by air resistance in seconds per 100 milliliters of cylinder displacement for approximately 6.4 square centimeters circular area of a paper using a pressure differential of 1.22 kPa in accordance with TAPPI T460 om-96.

Mean Flow Pore Size was measured according to ASTM Designation E 1294-89, "Standard Test Method for Pore Size Characteristics of Membrane Filters Using Automated Liquid Porosimeter" which approximately measures pore size characteristics of membranes with a pore size diameter of 0.05 μm to 300 μm by using automated bubble point method from ASTM Designation F 316-03.

Bubble Point was measured according to ASTM F 316-03 (2011). The bubble point test for maximum pore size is performed by prewetting the filter, increasing the pressure of gas upstream of the filter at a predetermined rate and watching for gas bubbles downstream to indicate the passage of gas through the maximum diameter filter pores. The pressure required to blow the first continuous bubbles detectable by their rise through a layer of liquid covering the filter is called the "bubble point", and is used to calculate maximum pore size.

Tensile Strength was measured according to ASTM D 828-97 with 2.54 cm wide test specimens and a gage length of 18 cm and reported in N/cm.

Ionic resistance was measured according to ASTM D7148-13 and reported in milliohms-cm$^2$.

Porosity was measured according to ASTM C830-00 and reported in percent (%).

MacMullin Number (Nm) is a dimensionless number and is a measure of the ionic resistance of the separator, and is defined as the ratio of the resistivity of a separator sample filled with electrolyte to the resistivity of an equivalent volume of the electrolyte alone.

Freeness. The Canadian Standard Freeness (CSF) of the fibrils or pulp was measured according to standard test method TAPPI T 227 using a Canadian Standard Freeness Tester Model 33-23 supplied by Testing Machines Inc., New Castle, Del., which measures the facility for water to drain from an aqueous slurry or dispersion of a pulp and is inversely related to the degree of fibrillation of the pulp as a greater numbers of fibrils will reduce the rate at which water drains through the paper mat that forms during the test. Data obtained from the test under the standard conditions are expressed in milliliters of water that drain from a slurry of 3 grams of pulp in 1 liter of water. A lower value indicates that a more fibrillated pulp will retain more water and drain more slowly.

Freeness. The Schopper-Riegler Freeness (SRF) was determined per BS EN ISO 5267-1 2001. The Schopper-Riegler test is designed to provide a measure of the rate at which a dilute suspension of pulp may be dewatered. SR Freeness (drainability) may be expressed in degrees Schopper-Riegler. The fibrous material to be tested is prepared in accordance with the test conditions defined in the above identified ISO standard. A volume of 1000 ml of the prepared pulp is poured into the drainage chamber. The discharge from the bottom and side orifices is collected. The filtrate from the side orifice is measured in a special cylinder, graduated in SR degrees. A discharge of 1000 milliliters corresponds to 0 degrees Schopper-Riegler while a discharge of 0 milliliters corresponds to 100 degrees Schopper-Riegler.

Fiber length. The length ("length-weighted average" length) of the fibrous material was measured in accordance with TAPPI Test Method T 271.

Average Length-to-Diameter Ratio. This was the calculated by dividing the "length-weighted average" length of the fibrils or pulps by their respective average visually-measured diameters. "Length-weighted average" length means the calculated length from the following formula $$L_W = \frac{\sum n_i l_i^2}{\sum n_i l_i}$$

wherein n is number of fibrils or pulpstalks and l is length of the individual fibril or the stalk of the pulp (pulpstalk).

The average "visually-measured diameter" of the fibrils and/or pulps was obtained by visually measuring from a photomicrograph of the fibrils and/or pulp the width of individual fibrils or the pulp stalks at several points (a least three) along the fibril or pulp stalk length. This was done for at least a dozen fibrils or pulp stalks pictured in the photomicrograph and an average visually-measured fiber diameter calculated.

The "length-weighted average" length of the fibrils and/or pulps were measured using a Fiber Expert tabletop analyzer supplied by from Metso Automation Inc., Kajaani, Finland. The analyzer takes photographic images of the fibrous material, which has been dispersed in water to form a slurry, with a digital CCD camera as the slurry flows through the analyzer and an integrated computer analyzes the fibers in these images to calculate their length expressed in millimeters as a weighted average. The "length-weighted average" length of the pulps were measured using a LS200 laser diffraction analyzer supplied by Beckman Coulter Inc., Miami, Fla. and expressed in micrometers.

Specific Surface Area. The specific surface area of on dry fibrous material (including fibrils) and was measured by nitrogen adsorption/desorption at liquid nitrogen temperature (77.3 K) using a Micromeritics ASAP 2405 Porosimeter and expressed in units of square meter per gram (m$^2$/g). Samples were out-gassed overnight at a temperature of 150° C., unless noted otherwise, prior to the measurements and the weight losses were determined due to adsorbed moisture. A five-point nitrogen adsorption isotherm was collected over a range of relative pressures, P/P$_0$, from 0.05 to 0.20 and analyzed according to the BET method (S. Brunauer, P. H. Emmett, and E. Teller, *J. Am. Chem. Soc.* 1938, 60, 309); P is the equilibrium gas pressure above the sample, P$_0$ is the saturation gas pressure of the sample, typically greater than 760 Torr.

Wide and Small Angle X-Ray Scattering test method was used to crystallinity and porosity measurements.

Instrument: Rigaku Micromax 007 custom pinhole SAXS system or Advanced Photon Source DND-CAT (sector 5), line ID-D.

X-ray source: for Rigaku instrument: rotating anode copper kα1 source. APS radiation energy is variable, but typically ~9 keV used (1.38 Å)

Detector: Bruker Vantec 2000 2048×2048 pixel 2D detector for Rigaku; set of three MAR detectors at APS, set up at wide-, mid-, and small-angle distances with simultaneous data collection. An unwarping routine is employed on the Vantec 2000 data collection software to correct for spatial and intensity fluctuations inherent to the detector.

Sample mounting: WAXS: straighten length of yarn with collodion solution; cut out small piece and affix single layer on sample plate. SAXS: wrap fiber around slotted sample plate ten times, fix with tape. Plate has holes in the middle of fiber bundles for x-ray transmission.

Data collection: Rigaku: data is collected for ½ hour per sample while under vacuum; APS data collection is typically 5 frames of about 1 second each, run in air. This is done twice, once with an attenuator (for high intensity at low q) and once without an attenuator. Data is stitched together at different distances/attenuations.

The Thermal Performance Protection Test (TPP) is a measure of the flammability performance of fabrics and sheets of material, providing realistic conditions of an exposure to combined radiant and convective heat. A sample is subjected to circumstances typical for fires: a constant combination of 50% radiant heat and 50% convective heat, at a constant heat flux of 84 kW/m$^2$ (2 cal/cm$^2$/sec). The test then measures the time that elapses and the amount of heat energy per surface area (TPP value) at which the temperature and energy transferred to the back of the fabric reaches a level which is equivalent to a second-degree burn, if the material was being worn. The TPP test used is that that has been adopted by ISO as a test method standard (ISO 17492) with a heat flux exposure of 80 kW/m². The US NFPA 1971 standard requires the ISO 17492 test to be carried out at a modified, increased heat flux exposure of 84 kW/m².

EXAMPLES

In the examples that follow, the fibrils were refined fibrils and were made as follows. Polyvinylpyrrolidone (PVP) polymer sold under the name of Sokalan® K30-P was obtained from BASF. The polyparaphenylene terephthalamide (PPD-T) polymer used in the Examples was made using the general polymerization procedures as generally disclosed in U.S. Pat. Nos. 3,869,429; 4,308,374; and 4,698,414.

The PPD-T polymer/PVP polymer blend fiber was made by forming separate polymer solutions and spinning fibers per the general procedure shown in United States Publication US2006/0113700 to Hartzler, et al. The first solution was 19.5 wt % PVP in sulfuric acid and was made by mixing PVP in sulfuric acid at room temperature. The second solution was 19.5 wt % PPD-T also in sulfuric acid. The PVP polymer solution was then combined with the PPD-T solution and mixed to form a spinning solution having a blend of polymers. This was done by centerline injection of the PVP polymer solution by a gear pump into a pipe carrying the PPD-T polymer solution, followed by a static mixer. This formed dispersed PVP polymer solution particles in the continuous PPD-T polymer solution phase.

Fiber yarn was made by extruding the spinning solution having the blend of polymers through a spinneret having a plurality of spinneret holes to form dope filaments. Specifically, the spinning solution having a blend of polymer described previously were air-gap spun into a multifilament yarn by extrusion of the solution through a 667-hole spinneret having orifice diameters of 0.063 mm through an 0.8 cm air gap into an aqueous coagulating bath at a temperature of 5 degrees Celsius containing about 5% sulfuric acid. The multifilament yarn was then washed and neutralized to remove the sulfuric acid solvent and dried and wound on bobbins.

The yarn was cut into floc having a length of 0.25 inches (0.20 cm). The floc was then refined by a single disk 12-inch Andritz laboratory refiner, using a aqueous slurry having 2 weight percent floc. The PPD-T/PVP fibrils were adequately formed after only 3 passes in the refiner. A sample was taken for testing and the material refined 3 more passes. An additional sample was taken for testing and the material refined 3 more passes. Table 1 provides data on the resulting fibrils, indicating that very fine fibrils were obtainable with just 3 passes, including data on Canadian Standard Freeness (CSF) and Schopper-Riegler Freeness (SRF). After just 3 passes in the refiner, the PPD-T/PVP blend floc was fully fibrillated to fibrils with a CSF of zero. Increasing refining time, i.e. increasing number of passes through the refiner, reduced the length of the nanofibrils. As a comparison to the data in Table 1, PPD-T pulp made with 3 passes through the refiner had a CSF of approximately 300 ml.

TABLE 1

| No. of Passes | CSF (ml) | Average Length (mm) | SRF (degrees) |
| --- | --- | --- | --- |
| 3 | 0 | 2 | 54.8 |
| 6 | 0 | 1.6 | 44.2 |
| 7 | 0 | 1.0 | 25 |

Various compositions of the PPD-T/PVP blend fibrils were then compared to commercially available 100% PPD-T pulp, available from E. I. du Pont de Nemours, Wilmington, Del. Table 2 provides characterization information on fibrils made with floc having different PPD-T/PVP blends and made with 3 passes through the refiner. The characterization of 100% PPD-T pulp made with 3 passes through the refiner is also shown.

Curve 20 of FIG. 3 is for the 87/13 PPD-T/PVP blend and Table 2 illustrates that with the inclusion of PVP, the apparent crystal size (ACS 110) of the PPD-T/PVP blend filaments decreased versus 100% PPD-T filaments and the PPD-T/PVP filaments have a much bigger pore size and distribution of pore size is totally different from curve 30, which is representative of PPD-T filaments that are used to make conventional PPD-T pulp.

TABLE 2

| PPD-T to PVP Ratio (wt. %) | Surface Area (m²/g) | ACS 110 (Å) | ACS 200 (Å) | ACS Mean (Å) | Orientation Angle (°) | Porosity Volume (%) | Medium Pore Size (nm) |
| --- | --- | --- | --- | --- | --- | --- | --- |
| 87/13 | 14 | 40.6 | 43.8 | 42.2 | 11.8 | 1.4 | 25.9 |
| 90/10 | 8.6 | 39.5 | 45 | 42.3 | 12.3 | 2.1 | 19.9 |
| 92.5/7.5 | NA | 40.4 | 45.4 | 42.9 | 13 | 1.3 | 17.2 |
| 100/0 | 4 | 45 | 44.1 | 44.6 | 15.7 | 0.5 | 2.3 |

When fibrids were included in the examples, meta-aramid fibrids were made from polymetaphenylene isophthalamide and were generated using the processes generally described in U.S. Pat. No. 3,756,908).

Reference Example 1 and Comparative Examples A-B

A paper designated Reference Example 1 was made from 100% PPD-T/PVP fibrils. The fibrils had a Canadian Standard Freeness of 0 ml and a specific surface area after drying of 13.8 m²/g. The PPD-T/PVP fibrils were composed of 87 weight percent of PPD-T and 13 weight percent of PVP. The paper was prepared from a dispersion of fibrils in water to form a slurry. The slurry was mixed to make the and the aqueous dispersion was poured with 8 liters of water into a 21×21 cm hand-sheet mold and a wet-laid sheet was formed. The hand-sheet was then removed and placed between two pieces of blotting paper, hand couched with a rolling pin and dried in a hand-sheet dryer at 150° C. for 10 minutes. A similar paper was made from 100% conventional PPD-T pulp, which was 100% commercially-available PPD-T pulp (Style 1F361, available from the DuPont Co., Wilmington, Del.). The pulp had a Canadian Standard Freeness of 260 ml, a specific surface area after drying of 9 m²/g, and was designated Comparative Example A. In addition, a similar paper was made from 100% PPD-T micropulp, made as described in US patent publications 2016/0362525 and 2017/0204258; this paper was designated Comparative Example B.

Properties of the resulting paper structures are listed in the Table 3. As shown in the table, the paper made with 100% fibrils provides better (higher) barrier properties, including low/small pore size and higher Gurley-Hill porosity; and higher tensile break strength. Surprisingly the papers have similar ionic resistance, which was unexpected, and which is believed due to the higher average length-to-diameter ratio.

TABLE 3

| Paper Properties | Unit | Reference Example 1 | Example A | Example B |
|---|---|---|---|---|
| Fibrous Material | — | Fibrils | Pulp | Micropulp |
| Fibrous Material/Fibrid Ratio | Weight % | 100%/0% | 100%/0% | 100%/0% |
| Thickness | μm | 580 | 790 | 480 |
| Basis Weight | g/m² | 180 | 176 | 170 |
| Gurley-Hill Porosity | seconds | 281 | 12 | 562 |
| Mean Flow Pore Size | μm | 0.11 | 0.77 | 0.16 |
| Tensile Strength | MPa | 6500 | 424 | 1186 |
| Ionic Resistance | Ohm-cm² | 13.59 | 14.34 | 46.28 |
| Bubble Point (Max Pore Size) | μm | 0.55 | 41.32 | 1.02 |
| Average Length-to-Diameter Ratio. | — | 2000 | 83 | 60 |

Examples 2-3 and Comparative Example C

Three different aramid papers were manufactured from PPD-T/PVP fibrils and MPD-I fibrids. The fibrils had a Canadian Standard Freeness of 0 ml and a specific surface area after drying of 13.8 m²/g. The PPD-T/PVP fibrils were composed of 87 weight percent of PPD-T and 13 weight percent of PVP, and had an average length-to-diameter ratio of about 2000. Each paper was prepared from an aqueous dispersion of fibrils and fibrids to form a slurry. Those slurries were mixed to make the blend ratios of the fibrils and fibrids as indicated in Table 4. The aqueous dispersion was poured with 8 liters of water into a 21×21 cm hand-sheet mold and a wet-laid sheet was formed. Each hand-sheet was then removed and placed between two pieces of blotting paper, hand couched with a rolling pin and dried in a hand-sheet dryer at 150° C. for 10 minutes. Properties of the resulting paper structures are listed in the Table 4.

The binder fibrids provide a paper that was appreciably higher in tensile strength; however, the higher proportion of fibrids negatively impacted the Gurley Hill Porosity, making Example C unsuitable.

TABLE 4

| Paper Properties | Unit | Example 2 | Example 3 | Example C |
|---|---|---|---|---|
| Fibril/Fibrid Ratio | Weight % | 100%/0% | 95%/5% | 90%/10% |
| Thickness | μm | 38 | 37 | 40 |
| Basis Weight | g/m² | 21.0 | 19.9 | 23.9 |
| Gurley Hill Porosity | second | 179 | 228 | 5,580 |
| Mean Flow Pore Size | μm | 0.114 | 0.121 | 0.078 |
| Tensile Strength | MPa | 19.74 | 21.35 | 24.50 |
| Ionic Resistance | Ohm-cm² | 3.98 | 5.33 | N/A |
| Porosity | % | 61 | 61 | 57 |
| MacMullin No. | — | 8.79 | 12.24 | N/A |

N/A—Not available

Comparative Examples D, E, & F

Comparative paper hand-sheets were made using the procedure of Example 1; however, the PPD-T/PVP fibrils were replaced with 100% commercially-available PPD-T pulp (Style 1F361, available from the DuPont Co., Wilmington, Del.). The pulp had a Canadian Standard Freeness of 260 ml, a specific surface area after drying of 9 m²/g and had an average length-to-diameter ratio of about 83. Properties of these comparative papers are shown in Table 5.

Table 5 illustrates the comparative materials had very low tensile strength and were therefore not acceptable. In addition, the Gurley Hill Porosity of the comparative materials indicated that these papers had too open of a structure and were therefore not acceptable.

TABLE 5

| Paper Properties | Unit | Example D | Example E | Example F |
|---|---|---|---|---|
| Pulp/Fibrid Ratio | Weight % | 100%/0% | 95%/5% | 90%/10% |
| Thickness | μm | 33 | 38 | 39 |
| Basis Weight | g/m² | 19.8 | 20.8 | 19.9 |
| Gurley Hill Porosity | second | 8 | 24 | 31 |
| Mean Flow Pore Size | μm | 2.73 | 2.91 | 3.86 |
| Tensile Strength | MPa | 3.17 | 5.75 | 4.72 |
| Ionic Resistance | Ohm-cm² | 2.27 | 4.70 | 5.98 |
| Porosity | % | 57 | 61 | 63 |
| MacMullin No. | — | 5.83 | 10.33 | 13.22 |

Figure 4:
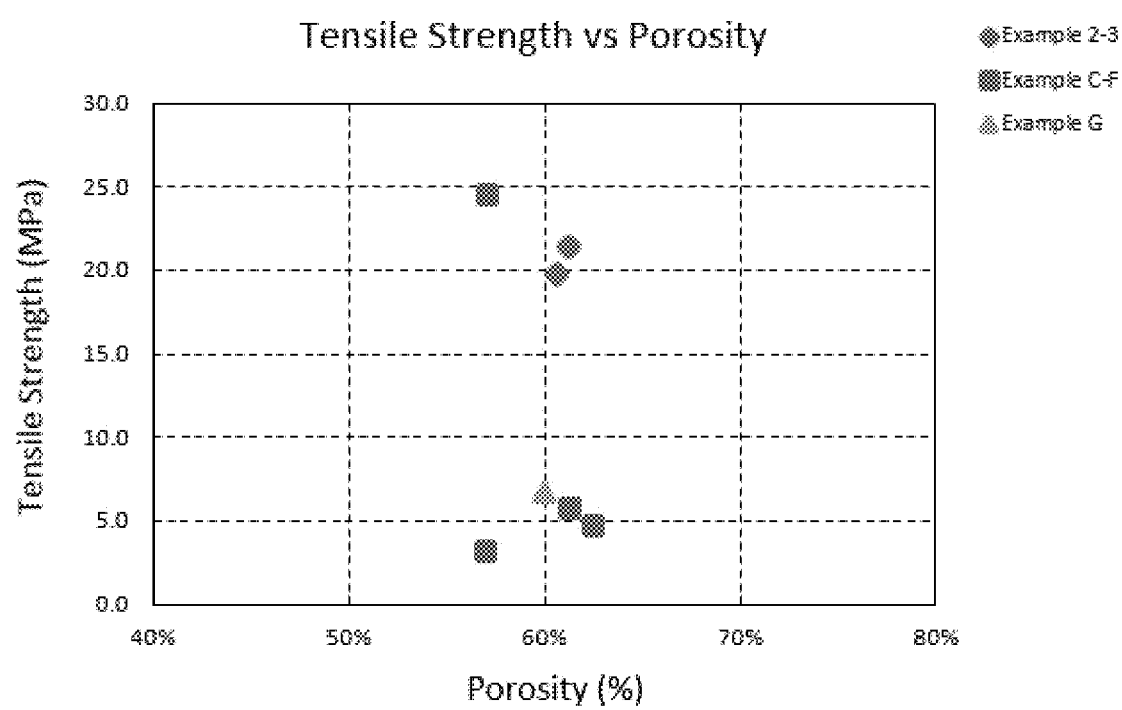
FIG. 4 is a graph of the relationship between tensile strength and paper porosity, illustrating improved paper tensile strength

The tensile strength of the papers made in Examples 2-3 and Comparative Examples D-F are summarized in Table 6, along with the properties of the highest tensile strength paper provided in the disclosure of Example 1 of publication US Pat. Publication 2016/0197325, designated Comparative Example G. For clarity, data is provided in the table both in units of N/cm, which is based on a certain thickness of the paper, and in MPa, which does not make any assumption of paper thickness. As shown in the Table 6 and illustrated in FIG. 4, the inventive papers have tensile strengths that are nominally 3 times those previously disclosed.

TABLE 6

| Example | Porosity (%) | Tensile Strength N/cm | Tensile Strength (MPa) |
|---|---|---|---|
| 2 | 61% | 19.56 | 19.74 |
| 3 | 61% | 21.30 | 21.35 |
| C | 57% | 24.50 | 24.46 |
| D | 57% | 3.17 | 3.165 |
| E | 61% | 5.50 | 5.75 |
| F | 63% | 4.52 | 4.72 |
| G | 60% | 5 | 6.67 |

Example 4 and Comparative Example H

This is an illustration of the flammability performance of papers containing PPD-T/PVP fibrils. Two papers were made per the procedure of Example 1; however, both papers had a higher basis weight, nominally 5 ounces/yd² (175 grams/meter²). The first paper (Example 4) was made from 100% PPD-T/PVP fibrils. The PPD-T/PVP fibrils had a Canadian Standard Freeness of 0 ml and a specific surface area after drying of 13.8 m²/g. The PPD-T/PVP fibrils were composed of 87 weight percent of PPD-T and 13 weight percent of PVP. The second paper (Comparative Example H) was made from PPD-T floc having a 6.4 mm (0.25 in) cut length.

Single layers of each paper were subjected to the Thermal Performance Protection Test (TPP), with the results shown in Table 7. The normalized TPP per unit thickness was surprisingly better for the paper containing the PPD-T/PVP fibrils, as the paper did not contain all aramid materials.

TABLE 7

| Example | Composition | Basis Weight (g/m²) | Thickness (mm) | TPP 2nd Degree Burn (seconds) | TPP per unit thickness (sec/mm) |
|---|---|---|---|---|---|
| 4 | PPD-T/PVP Fibrils | 172 | 0.62 | 6.3 | 10 |
| H | PPD-T Floc | 174 | 2.39 | 12.3 | 5 |

What is claimed is:

1. A paper suitable for use as a separator paper in electrochemical cells comprising, as the sole fibrous components:
 a) 95 to 100 weight percent fibrils, and
 b) 0 to 5 weight percent aramid fibrids;
 the paper having a thickness of 10 to 40 micrometers and a tensile strength of at least 15 megapascals or greater, wherein the fibrils comprise a polymer blend of 80 to 96 weight percent polyparaphenylene terephthalamide and 4 to 20 weight percent of polyvinylpyrrolidone,
 the fibrils having
 i) diameter of 10 to 2000 nanometers,
 ii) a length of 0.2 to 3 millimeters,
 iii) a specific surface area of 3 to 40 square meters/gram, and
 iv) a Canadian Standard Freeness of 0 to 10 milliliters.

2. The paper of claim 1 having a tensile strength of 100 megapascals or less.

3. The paper of claim 2 having a tensile strength of 50 megapascals or less.

4. The paper of claim 1 having a mean flow pore size of 0.05 to 0.5 micrometers.

5. The paper of claim 1, wherein the fibrils have a diameter of 10 to 1200 nanometers.

6. An electrochemical cell comprising the paper of claim 1.

* * * * *